G. T. NICHOLS.
AUTOMOBILE WHEEL RIM.
APPLICATION FILED APR. 7, 1920.
1,423,354.
Patented July 18, 1922.
2 SHEETS—SHEET 1.
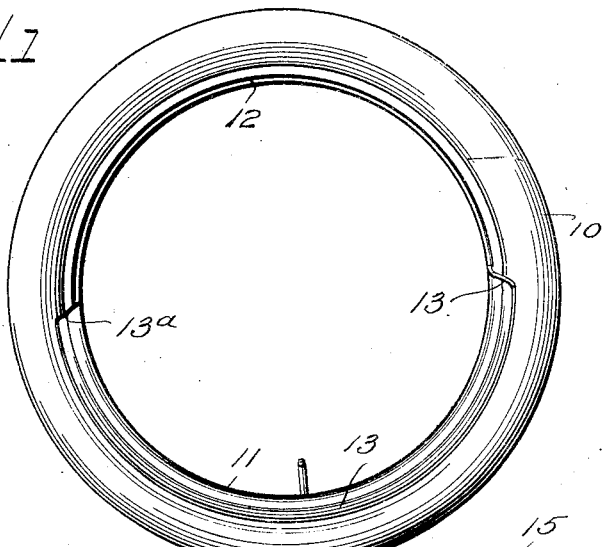
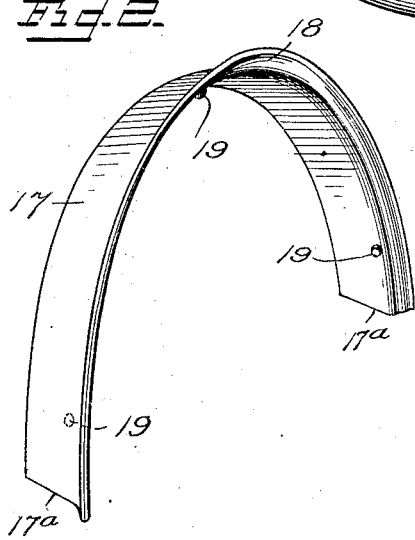
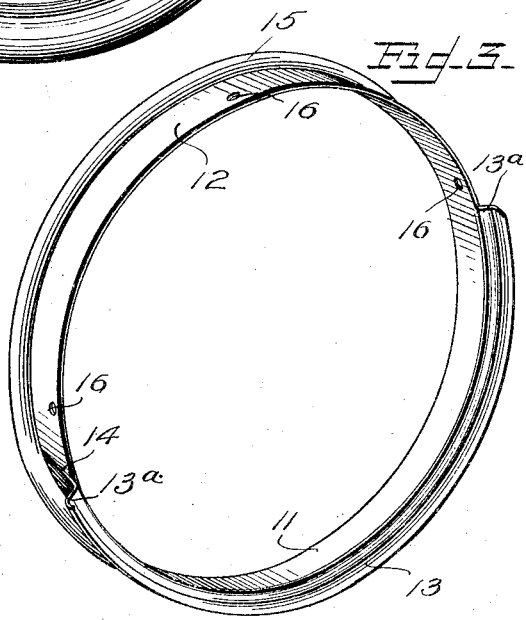
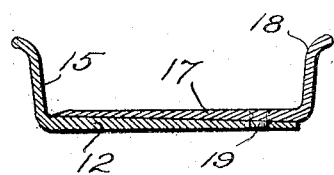
WITNESSES
Charles H Ourand
Philip E. Siggers
George T. Nichols
INVENTOR
BY
E. G. Siggers
ATTORNEY G. T. NICHOLS.
AUTOMOBILE WHEEL RIM.
APPLICATION FILED APR. 7, 1920.
1,423,354.
Patented July 18, 1922.
2 SHEETS—SHEET 2.
Fig. 5.
Fig. 6.
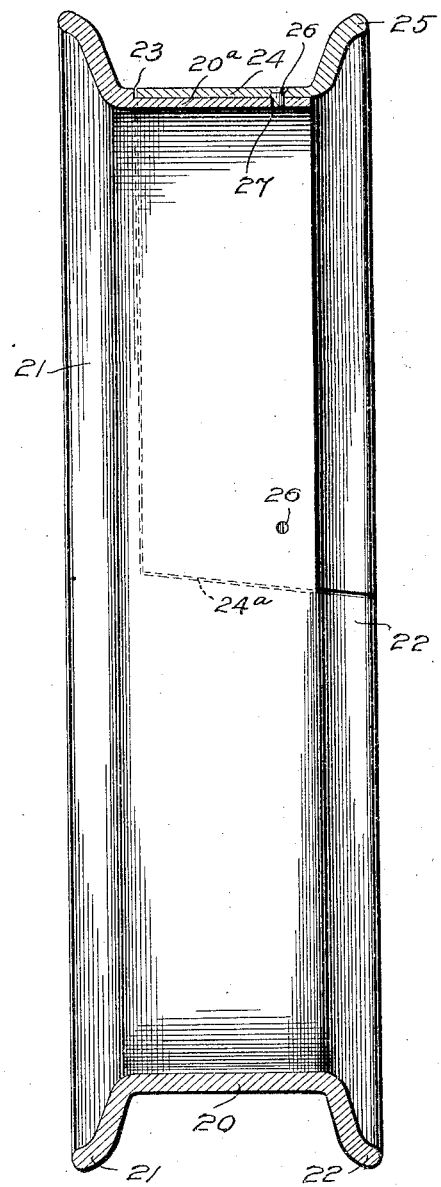
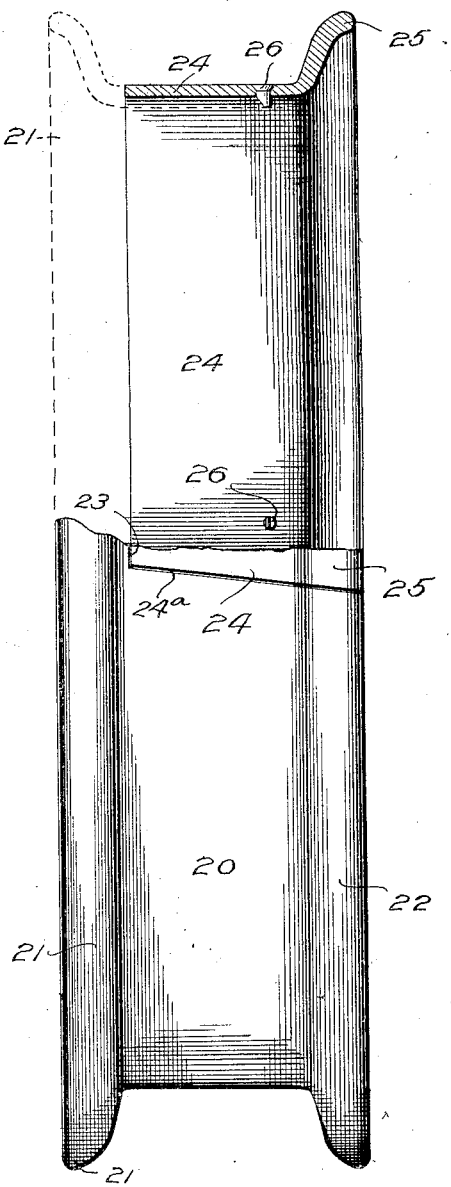
George T. Nichols,
INVENTOR,
WITNESSES
E. C. Duffy
Philip E. Siggers
BY
E. G. Siggers
ATTORNEY

UNITED STATES PATENT OFFICE.

GEORGE THOMAS NICHOLS, OF GAINESVILLE, TEXAS, ASSIGNOR OF ONE-TENTH TO JOHN P. WALLING, OF GAINESVILLE, TEXAS.

AUTOMOBILE WHEEL RIM.

1,423,354.    Specification of Letters Patent.    Patented July 18, 1922.

Application filed April 7, 1920. Serial No. 371,941.

*To all whom it may concern:*

Be it known that I, GEORGE T. NICHOLS, a citizen of the United States, residing at Gainesville, in the county of Cooke and State of Texas, have invented a new and useful Automobile Wheel Rim, of which the following is a specification.

This invention relates to rims designed for automobile wheels, and the general object of the invention is to provide a rim which makes the operation of mounting or demounting a tire a simple and easy one.

Another object of the invention is to provide a rim which may be used with either the quick detachable type or the demountable type of wheel.

Other objects are to provide a rim which is easily made, which requires no special tools or skill when a tire is to be mounted on the same, and which eliminates most of the objections now made to the principal types of rims on the market.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings,

Fig. 1 is an elevation of a tire mounted on a portion of my improved rim.

Fig. 2 is a perspective view of the locking section of the improved rim.

Fig. 3 is a similar view of the section shown associated with the tire in Fig. 1.

Fig. 4 is a cross section showing the manner in which the parts illustrated in Figs. 2 and 3 fit upon each other when in place.

Fig. 5 is a diametric cross section through a modified form of rim embodying the principles of the present invention.

Fig. 6 is a quarter section of the same.

The numeral 10 indicates the tire which is to be held upon the wheel by the rim of the present invention. This rim comprises two parts, namely, a ring and a locking segment. One form of the ring is shown in Fig. 3, while the locking segment is shown by itself in Fig. 2.

The ring of Fig. 3 comprises an arcuate section 11, the arc of which equals a semi-circumference and a section 12 of reduced thickness likewise comprising a semi-circumference. These two sections are continuous to form a solid ring and are of like width throughout. A circular flange 15 of the usual formation follows one edge of the ring. The opposite edge of the ring, however, carries a flange 13 only along the section 11 of the ring. The flanges 13 and 15 are formed exactly alike. The ends 13$^a$ of the flange 13 are at diametrically opposite points.

The section 11 has a thickness approximately double the thickness of the section 12, and where the two sections join, a shoulder 14 is provided, tapering in thickness or in height from the flange end 13$^a$ inwardly toward the annular flange. In other words, the shoulder 14 has its greatest height at that edge of the ring which carries the flange 13, while on the other side of the ring the shoulder merges into the flange 15. The shoulder 14 lies in the same plane with the flange end 13$^a$, and the shoulder 14 is disposed at an acute angle with the annular flange 15.

The ring section 12 tapers slightly in thickness, as shown in Fig. 4, from the edge which carries the flange 15, to the edge remote therefrom. This taper in the thickness in the ring section 12 corresponds with the taper in the thickness or height of the shoulder 14. An arcuate ring segment 17 is adapted to fit upon the section 12 between the shoulders 14. This arcuate segment 17 comprises a semi-circumference and has a flange 18 at one edge thereof. The flange 18 is formed exactly like the flanges 15 and 13, but like the flange 13 extends for only half of a circumference. The taper of this locking segment is shown in Fig. 4 and is opposite to the taper of the ring section 12, so that when the locking segment 17 is put upon the ring section 12 to complete the rim of the invention, the effective thickness of the rim where the two parts join will be substantially the same from the flange 15 to the flange 18. The thickness of the ring section 11 is made double the thickness of the ring section 12 so that when the locking segment is in place the completed rim will be perfectly balanced.

Means are provided for locking the segment 17 upon the ring so that when once in place the locking segment will hold the tire upon the rim even though in deflated condition. Such means is shown as comprising a plurality of holes 16 provided in the ring section 12 near the thin edge thereof and a properly spaced series of pins 19 adapted to engage in said holes, the pins 19 being provided on the locking segment 17. The pins 19, as seen in Fig. 4, have one side thereof tapered or beveled so that when the locking segment 17 is placed over the complementary ring section 12 the beveled edge will allow the locking segment to ride over the small edge of the ring section. The other side of each pin 19 is straight so that when the pins are once in place that side will hold the locking segment 17 from outward movement with respect to the ring. The locking segment 17 has sufficient resilience so that the pins will snap into position in the holes 16 as the locking segment is pushed over the ring section.

When the locking segment is in position, its end 17ª will abut against the shoulder 14 and flange end 13ª and fit nicely against the same. These ends 17ª are disposed at an angle to the remainder of the locking segment so as to correspond with the angular disposition of the shoulder 14. When the rim is assembled it forms a continuous rim exactly like the rims of the demountable type except that there is no joint or break extending entirely through the rim, but instead there are two diametrically opposite joints where the ends 17ª of the locking segment abut the shoulders 14.

A modification of the invention is illustrated in Figs. 5 and 6, which modification, however, adheres to the principles underlying the construction already described. This modified form of rim comprises a ring section 20 having an annular flange 21 and a semi-circular flange 22. A locking segment 24, like the segment 17 except that there is no taper in the thickness thereof, is provided to form with the ring 20 a complete rim. The locking segment 24 is seated upon the ring 20 in a recess to an extent approximating a semi-circle, which recess is formed by the material of the ring being cut away to form a portion of half the thickness of the rest of the ring, the portion of reduced thickness being indicated by the numeral 20ª.

A shoulder 23 is provided running half way around the ring 20 close to where the flange 21 rises above the main body of the ring. The locking section 24 has its inner or unflanged edge abutting against the shoulder 23 when the parts are in position, as Fig. 5 indicates. When in such position, a joint indicated at 24ª is provided at diametrically opposite points on the rim, such joints being comparable to the joints formed by the ends 17ª and shoulders 14 of the previously described embodiment of the invention. In the present construction, however, the material of the ring, as at 20ª, has the same thickness throughout and does not taper, while the segment 24 has a like thickness throughout. The segment 24, when in position upon the ring, forms with the latter a portion of a thickness equal to the full thickness of the ring 20. Pins 26 are provided on the segment 24 to engage in holes 27, such pins and holes being precisely like the pins 19 and holes 16 previously described.

The chief difference between the two described embodiments of the invention is that in the one case the locking segment and the ring where joining taper in a complementary fashion, while in the other construction a recess is provided in the ring to receive the locking segment and neither part is tapered. In either form, the rim when assembled is capable of being used either with the quick detachable type of wheels or demountable type. In either case, the assembled rim presents two continuous annular flanges which may be of the proper shape to hold either kind of tire thereon.

When a tire is to be mounted upon the rim of the present invention, either form of ring will be fitted into the tire in the manner disclosed in Fig. 1. Because of the fact that the flange of the ring on one side thereof extends for only half of a circumference, this operation may be effected without the use of tools of any kind. The locking ring is now pushed into place between the ring section and the bead of the tire. This also may be done without the use of tools of any kind, though possibly a small screw driver or similar instrument may be used in aiding the seating of the pins in their holes. The tire may now be inflated whereupon the two sections of the rim will be locked together so tightly that separation is absolutely impossible.

If the tire blows out or is punctured and runs flat, it may be readily removed from the rim of the present invention by the aid of nothing more than a small screw driver or similar lever. This instrument will be forced between the locking segment and the ring section which seats the same near one of the pins 19 to raise the same out of its recess or hole, then the other pins will be lifted out of their seats, one by one, by merely pressing upwardly upon the locking segment. The latter may now be pulled outward, whereupon the tire is easily taken off the ring by hand. No matter how large a tire may be used and regardless of the lack of skill on the part of the driver, the operation of removing and putting on a tire is, with the aid of the present invention, made possible by all. Whether the tapering form of ring be used or the recessed type, the operation of putting on or taking off a tire may be done by a child in a few minutes.

An important feature of this invention, as a demountable rim, is the capability of removing a deflated tire from the rim without removing the rim from the wheel and without taking out any fastening means. This is due to the unique feature of the recess or seat in the ring which receives the locking segment. Because of the fact that the said segment is substantially the full width of the rim, both beads of the tire rest squarely upon the segment, giving more inward pressure than outward and holding the locking segment from kicking up or turning outwardly.

What is claimed is:

1. A wheel rim comprising a ring having a section thereof of less thickness for a portion of its circumference and transversely of the rim than the remaining section, apertures provided at spaced intervals in said section, an arcuate segment complementary to the ring and fitting over the thin section thereof, the combined thickness of the segment and of the section where fitted together being equal to the thickness of the remaining section, said segment being provided with means for engaging with said apertures whereby the segment is held in place upon the ring.

2. A wheel rim comprising a ring, and an arcuate segment complementary to the ring and fitting over a portion of the same, said segment carrying pins, said ring having apertures to receive the pins, said pins being beveled or tapered on that side which engages with the ring when the segment is put on.

3. A wheel rim comprising a ring made up of two continuous sections of different thicknesses, a shoulder defining the sections and rising above the thinner section, said shoulder running substantially transversely of the ring, and a locking segment fitting over the thinner section and extending the greater portion of the width of the rim between said shoulders with its ends shaped to abut against the shoulders, said ring and segment having cooperating means for holding the segment in place whereby when the segment is in place both beads of the tire are caused to bear upon the segment.

4. A wheel rim comprising a ring and a locking segment, said segment being arcuate and flanged on one edge, said ring being flanged continuously on one edge and partially on the other edge, the ring being shaped to receive the segment with the segment overlying the ring and with the flange of the segment received between and abutting against the ends of the partial flange of the ring.

5. A wheel rim comprising a ring and a locking segment shaped to fit upon said ring, said ring having shoulders at points substantially diametrically opposite, the ring also having a continuous flange on one edge and an arcuate flange on the other edge, the ends of the arcute flange lying in the same plane with the corresponding shoulders and being disposed at diametrically opposite points, the ends of said segment being shaped to abut the shoulders and flange ends aforesaid when the segment is in position upon the ring.

6. A wheel rim comprising a ring and a locking segment adapted to fit upon a portion of said ring, said segment being arcuate and flanged along one edge thereof, said ring being flanged continuously on one edge and carrying an arcuate flange on the other edge, said ring being of varying thickness for a portion of its circumference with the arcuate section having the single flange of less thickness than the remaining section of the ring, said segment fitting upon the thin section of the ring to form a rim of substantially equal thickness having two annular flanges.

7. A wheel rim comprising a ring and a locking segment held upon said ring, said segment being arcuate and flanged along one edge, said ring being flanged continuously on one edge and partially on the other edge, diametrically opposite shoulders provided upon the ring lying in the same planes with the ends of the partial flange, said segment being received between said shoulders and flange ends and abutting against the same at its ends and extending substantially across the width of the ring and overlying the latter, the segment where seated upon the ring forming therewith a rim of substantially equal thickness throughout, and means projecting from the inner face of the segment and engageable with means on the seating section of the ring for holding the segment in position.

8. A wheel rim comprising a ring having a recess or seat formed on the periphery thereof, and a locking segment adapted to seat in said recess, transversely disposed shoulders provided on the ring to fit against the ends of the segment, when the latter is in place, said ring having an annular flange on one edge thereof and a second flange extending for approximately half a circumference on the other edge, the arcuate flange ending with the shoulders and having its ends in line therewith, a shoulder provided near the continuous flange of the ring and extending between the transverse shoulders, the three shoulders aforesaid providing the recess in which the segment seats, and means for holding the segment in position in said recess.

9. A wheel rim comprising a complete ring having a section thereof of less thickness than the remaining section, said ring being flanged continuously along one edge and partially along the other edge, an arcuate segment complementary to the ring and fitting over the thin section thereof, the combined thickness of the segment and of the said thin section of the ring where fitted together being equal to the thickness of the remaining portion of the ring, said segment being flanged along one edge and extending substantially the full width of the rim, whereby when the segment is in place both beads of the tire are caused to bear upon the segment.

10. A wheel rim comprising a ring having an arcuate section of the full thickness of the rim and an arcuate section of reduced thickness, shoulders being provided where the two sections join, said shoulders tapering in thickness inwardly, said sections being continuous forming a solid ring of like width throughout, a circular flange along one edge of the ring, an arcuate flange at the opposite edge of the ring along the first-mentioned arcuate section, the second-mentioned arcuate section tapering in thickness from one edge to the other, and an arcuate segment adapted to fit upon the second-mentioned arcuate section and tapered oppositely thereto and extending substantially the full width thereof, the ends of the segment abutting said shoulders, said segment having a flange along its outer edge, the said flange abutting at its ends the flange on the edge of the first-mentioned arcuate section whereby when the segment is in place both beads of the tire rest thereupon.

In testimony that I claim the foregoing as my own, I have hereto affixed my signature.

GEORGE THOMAS NICHOLS.